(12) United States Patent
Balay et al.

(10) Patent No.: US 7,139,288 B2
(45) Date of Patent: Nov. 21, 2006

(54) PROTOCOL-INDEPENDENT PACKET DELINEATION FOR BACKPLANE ARCHITECTURE

(75) Inventors: Francois Balay, Munich (DE); Barry K. Britton, Orefield, PA (US); Paul A. Langner, Orefield, PA (US); John B. McCluskey, Montreal (CA); Shakeel H. Peera, Whitehall, PA (US)

(73) Assignee: Agere Systems Inc., Allentown, PA (US)

( * ) Notice: Subject to any disclaimer, the term of this patent is extended or adjusted under 35 U.S.C. 154(b) by 968 days.

(21) Appl. No.: 10/045,643

(22) Filed: Nov. 7, 2001

(65) Prior Publication Data

US 2004/0071224 A1    Apr. 15, 2004

Related U.S. Application Data

(60) Provisional application No. 60/310,192, filed on Aug. 3, 2001.

(51) Int. Cl.
 *H04J 3/00* (2006.01)
 *H04J 3/04* (2006.01)

(52) U.S. Cl. ..................... 370/476; 370/536

(58) Field of Classification Search ................ 370/465, 370/466, 474, 476, 535–536
See application file for complete search history.

(56) References Cited

U.S. PATENT DOCUMENTS 5,018,132 A * 5/1991 Williams et al. ............ 370/476
6,160,819 A * 12/2000 Partridge et al. ........... 370/474
6,799,224 B1 * 9/2004 Dellacona ................... 709/225
2002/0136208 A1 * 9/2002 Skirmont et al. ........... 370/352
2004/0228364 A1 * 11/2004 Walker et al. .............. 370/470

* cited by examiner

Primary Examiner—Kevin C. Harper

(57) ABSTRACT

Multiple single-channel links are employed as a single high-bandwidth link for packetized data having a single packet delineator. The single high-bandwidth link may typically be employed for transfer of data in intra- and inter-frame/rack back-planes. A transmitter forms the packetized data including the single packet delineator. The packet delineator is used by, for example, a framer of a receiver to enable reconstruction of packetized data from the multiple single-channel links. The transmitter forms the packetized data such that a beginning portion of each packet is transferred to a particular one of the single-channel links. Thus, the packet delineator is associated with that particular single-channel link, regardless of the number of other single-channel links that are bonded together with that particular single-channel link to form the single high-bandwidth link. A single high-bandwidth link, formed in accordance with one or more embodiments of the present invention, significantly reduces the cost per link over prior art systems, while maintaining relatively similar link quality. The transmitter may ensure that the packet delineator is associated with a particular single-channel link by inserting inter-packet fill bits into the packet stream. The total amount of inter-packet fill inserted into the packet steam between packets is such that the total length of the packet plus inter-packet fill is a number that is wholly divisible by the number of single-channel links.

38 Claims, 2 Drawing Sheets

PROTOCOL-INDEPENDENT PACKET DELINEATION FOR BACKPLANE ARCHITECTURE

CROSS-REFERENCE TO RELATED APPLICATIONS

This application claims the benefit of the filing date of U.S. provisional application No. 60/310,192, filed on Aug. 3, 2001.

BACKGROUND OF THE INVENTION

1. Field of the Invention

The present invention relates to transmission of data in one or more channels between modules interconnected by physical communication links in a terminal.

2. Description of the Related Art

Telecommunication systems include terminal equipment that processes data at exceptionally high data-rates, since such processing generally occurs with a speed greater than the transmission rate of the signals received and transmitted through the terminal. Such equipment may be physically implemented with specialized circuit boards mounted in slots within racks that make up the terminal equipment frame. Circuit boards and racks are interconnected with data communication links (e.g., parallel data buses or serial data links) that are part of a back-plane that is common to some or all of the racks.

However, as inter-board and inter-rack data rates in high speed systems (e.g., networking switches and routers) continue to increase, it is increasingly desirable to include back-plane communication links that are inexpensive to implement while providing relatively high-quality communication performance. High quality may be measured in terms such as low bit error rate (BER) or high total data throughput. However, these two requirements are hard to meet at the same time. Due to these high speeds of data in the back-plane, multiple physical links are typically needed for the required bandwidth of the communication link, thus increasing the cost of implementing the communication links.

Different methods exist to implement high-speed back-planes. Parallel back-planes include 32-bit and 64-bit PCI buses. Serial interfaces include 8b/10b encoded data (e.g., FibreChannel and Ethernet) and scrambled data (e.g., pseudo-SONET implementations).

Serial interfaces such as FibreChannel, Ethernet, and pseudo-SONET were initially implemented as single-channel communication links, but some recent implementations use ("bond") multiple single-channel links into a single high-bandwidth link. In order to transfer packet data across multiple, bonded links, two different implementations are employed in the prior art, both of which lead to very high cost of implementation. The first implementation concatenates all of the incoming data streams into a single data stream at a bit rate that is the incoming bit rate multiplied by the number of physical links bonded together. The second implementation performs packet delineation on each individual link independently, thus requiring as many packet framers as there are links. One cost associated with using multiple physical links with packet delineation is the cost added by a high-speed framer that must be associated with each link.

SUMMARY OF THE INVENTION

In accordance with embodiments of the present invention, multiple single-channel links are employed as a single high-bandwidth link for packetized data using a packet format with a single packet delineator. A transmitter forms the packetized data, including the single packet delineator. The packet delineator is used by, for example, a framer of a receiver to enable reconstruction of packetized data from the multiple single-channel links. In accordance with embodiments of the present invention, the transmitter forms the packetized data such that a beginning portion of each packet is transferred to a particular one of the single-channel links. Thus, the packet delineator is associated with that particular single-channel link, regardless of the number of other single-channel links that are bonded together with that particular single-channel link to form the single high-bandwidth link. A single high-bandwidth link reduces the cost per link while maintaining relative link transmission quality. The transmitter may ensure that the packet delineator is associated with the particular single-channel link by inserting inter-packet fill bits into the packet stream. The total amount of inter-packet fill inserted into the packet steam between packets is such that the total length of the packet plus inter-packet fill is a number that is wholly divisible (integer number) by the number of single channel links.

In accordance with one exemplary embodiment of the present invention, a transmitter is coupled to at least two single-channel links of a high-bandwidth link. The transmitter comprises at least two registers and a framer. Each of the at least two registers is associated with a single channel link and each receives a portion of user data provided to the transmitter from a module. The framer provides i) the user data from the module as a packet having a packet delineator and the user data based on a packet format, and ii) the packet delineator on a particular single-channel link. One register provides a portion of the packet with the packet delineator to the particular single-channel link, and each register provides a corresponding portion of the packet to an associated single-channel link.

In accordance with another exemplary embodiment of the present invention, a receiver generates user data for a module from a packet received from at least two single-channel links forming a high-bandwidth link. The receiver comprises at least two registers and a framer. The at least two register each receive a portion of the packet, wherein one register provides a portion of the packet with a packet delineator from a particular single channel link, and each register provides a corresponding portion of the packet from an associated single-channel link. The framer 1) forms the packet from the packet delineator and 2) extracts the user data based on a packet format.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
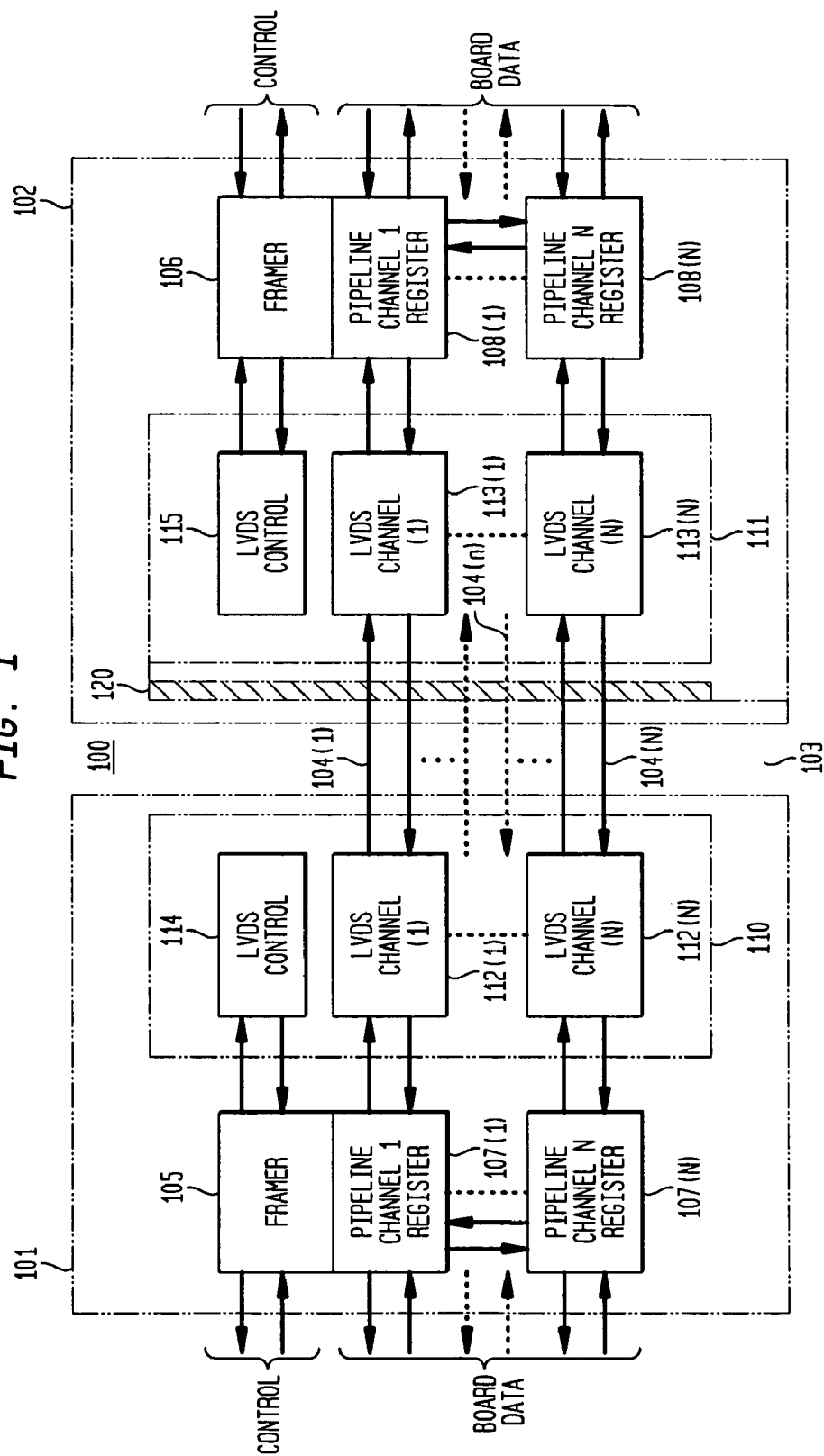
FIG. 1 shows an exemplary system with two sections coupled by a single high-bandwidth link in accordance with an exemplary embodiment of the present invention.

FIG. 1 shows an exemplary system 100 with first and second sections 101 and 102 coupled by a single high-bandwidth link 103 in accordance with an exemplary embodiment of the present invention. High-bandwidth link 103 comprises two or more (logical) pipeline channels 1 through N, each associated with a corresponding one of (physical) single-channel links 104(1) through 104(N). High-bandwidth link 103 allows transfer of packetized data between transmit and receive sides of sections 101 and 102 (e.g., between modules through a back-plane and within a terminal). The packetized data is unit data and control information exchanged between the units formed into a packet having a single packet delineator. The packetized data is divided into portions, with each portion assigned to a pipeline channel and electrically transmitted at a predetermined rate through one of the single-channel links.

FIG. 1 shows bi-directional communication between sections 101 and 102, and, for convenience, the following describes one communication in one direction from the transmit side of section 101 to the receive side of section 102. A high-bandwidth link, formed in accordance with one or more embodiments of the present invention, significantly reduces the cost per link over prior art systems, while maintaining relatively similar or better link quality (BER or throughput) when compared to high-bandwidth links of the prior art.

Control information and data generated by modules (e.g., circuit packs, boards, or similar units) during operation are applied to and read from sections 101 and 102. Sections 101 and 102 may be communication transceivers or similar interfaces located on or coupled to corresponding circuit packs, boards, or similar units within a frame, while the high-bandwidth link 103 may be in part or in whole included within the back-plane that interconnects the modules. Section 101 is shown comprising framer 105, registers 107(1) through 107(N) associated with corresponding pipeline channels 1 through N, and (physical layer) link interface 110. Section 102 similarly comprises framer 106, registers 108(1) through 108(N) associated with the corresponding pipeline channels 1 through N, and (physical layer) link interface 111.

Physical layer transmission may be implemented using low-voltage differential signal (LVDS) techniques. Consequently, link interface 110 employs LVDS channels 112(1) through 112(N) and LVDS control 114. Similarly, link interface 111 employs LVDS channels 113(1) through 113(N) and LVDS control 115. Each of the LVDS channels is employed to generate an analog signal for transmission of binary data through a physical medium of the corresponding single-channel link, such as a wire or optical fiber. Differential signals are commonly employed for their noise rejection characteristics. However, a skilled artisan may employ any number of known transmission formats designed to reconstruct binary data from analog signals to improve the bit error rate (BER) performance.

The transmit side of section 101 forms a packet of data with a single packet delineator. Control information is received at framer 105, and a portion of the data is received at each of the registers 107(1) through 107(N). Framer 105 creates the packetized data with a predefined packet format, such as the format described subsequently with respect to FIG. 2, using the data of the registers 107(1) through 107(N). The $n^{th}$ portion of the packet in a particular pipeline channel (n) is transferred from the corresponding register 107(n) to, for example, a corresponding LVDS channel 112(n) of line interface 110. The nth portion is then transferred via LVDS channel 112(n) to corresponding single-channel link 104(n).

In the receive side of section 102, for a given pipeline channel (n), a corresponding LVDS channel 113(n) of line interface 111 receives the analog signal from the single-channel link 104(n). The received values of the analog signal in LVDS channels 113(1) through 113(N) are provided to registers 108(1) through 108(N) respectively. A separate, LVDS control channel may be present for supervision of signals transferred through link interface 110 and/or link interface 111. As shown in FIG. 1, supervisory information from the LVDS control channel is provided from LVDS control 115 to register 108(1) for use by framer 106.

Based on the portion of the packet in the pipeline channel register containing the packet delineator, receiver section 102 reconstructs the packet that was received from the multiple single-channel links 104(1) through 104(N). In accordance with embodiments of the present invention, the transmitter forms the packetized data such that a beginning portion of each packet is transferred through the same pipeline channel of a particular one of the single-channel links, such as single channel link 104(1). The packet delineator is employed by framer 106 of receiver section 102 to enable reconstruction of each packet from the single-channel links. Thus, the packet delineator is associated with that particular single-channel link, regardless of the number of other single-channel links that are bonded together to form the high-bandwidth link.

Figure 2:
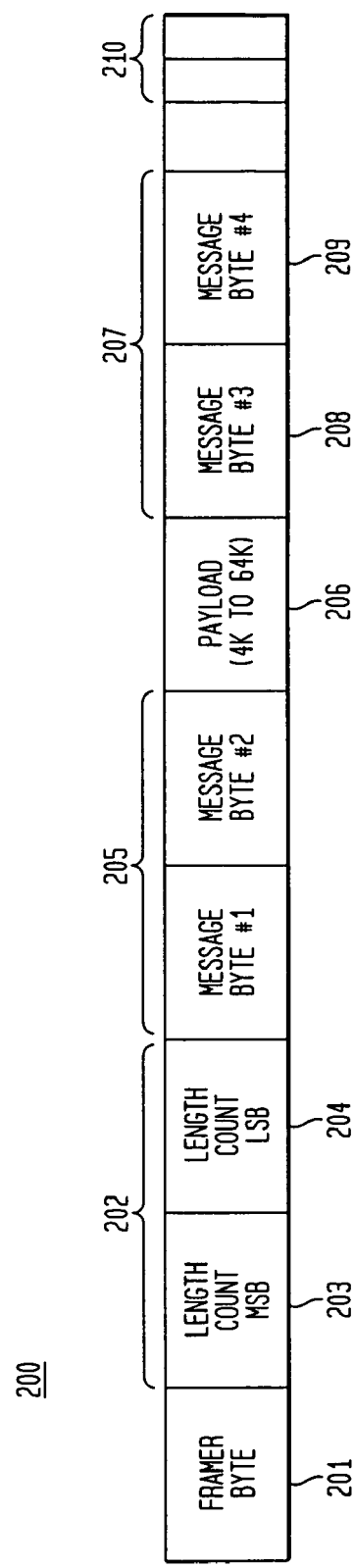
FIG. 2 shows an exemplary packet format for packetized data including a packet delineator as may be employed by the system of FIG. 1.

FIG. 2 shows an exemplary format of packet 200 that may be used for packetized data transmitted between sections over high-bandwidth link 103 of FIG. 1. As shown in FIG. 2, packet 200 comprises packet delineator 201, packet length count 202 (comprising at least two bytes 203 and 204), first message 205, payload 206, and second message 207.

Packet delineator 201, shown in FIG. 2 as a framer byte, is a binary value created by a framer in the transmit side and is used by another packet framer in the receive side to detect the beginning of a new packet. In the current example, packet delineator 201 is used by receiver section 102 for frame synchronization across the two or more single-channel links of high-bandwidth link 103.

Packet length count 202 indicates the length (e.g., in bytes) of either the payload 206 or the entire packet 200. Receiver section 102 may employ the packet length count to determine the number of single-channel links carrying portions of the packetized data when packets are of variable length. For either fixed-length or variable-length packets, packet length count 202 may also be employed to determine the amount of packet fill inserted between packets of the high-bandwidth link. For preferred embodiments, the length (i.e., packet size) is based on the user data and controlled by a user interface (not shown in the figures). Packet size may change dynamically for each packet transmitted.

First message 205 may be employed to communicate information between, for example, modules (e.g., either between circuit packs or between one or more ASICS within the circuit packs) that generate and use the information of payload 206. Payload 206 comprises the data to be transmitted through the high-bandwidth link. Optional status bytes for monitoring link quality, operations, and maintenance functionality may be integrated into payload 206 during transmission and removed when received. These bytes are not necessarily considered part of the payload 206 by higher layers of the transmission protocol.

Second message 207 may comprise two bytes 208 and 209 representing a binary value for error detection and correction, such as the cyclic redundancy check (CRC) value that is used for CRC processing to detect packets with one or more bits in error. In some embodiments of the present invention, the framer byte of packet delineator 201 may be or may include CRC information.

Transmitter section 101 may ensure that packet delineator 201 of packet 200 is associated with the particular single-channel link by inserting inter-packet fill bits into the packet stream. The inter-packet fill is shown as interpacket fill bytes 210 in FIG. 2. The total amount of interpacket fill inserted into the packet steam between packets is such that the total length of the packet plus inter-packet fill is a number that is wholly divisible (i.e., provides an integer result) by the number N of single-channel links in the high-bandwidth link.

For example, a high-bandwidth link may be used that operates at 2.5 Gbit/s and employs four single-channel links (N=4). For this high-bandwidth link, the total of all bytes for a given packet (including frame-byte, length count bytes, all message bytes, and payload) may be padded with up to three non-framing bytes so that the next framing byte lines up with the first single-channel link.

For the system of FIG. 1, when there is no data available to be send across the link, some embodiments of the present invention may transmit fill bytes (again the number sent must be divisible by N) until the next framing byte is ready to be sent. This allows a framer on the receive side to throw away this inter-packet fill until the next valid packet is received.

Exemplary embodiments of the present invention may be provided for typical back-plane applications in telecommunications equipment. A single-channel link including control may be provided for operating at 622 Mbit/s for communication equipment processing of, for example, asynchronous transfer mode (ATM), SONET, backbone Internet protocol (IP), UTOPIA, ETHERNET, FibreChannel, or other similar high-capacity signals. When two single-channel links are available, each operating at 622 Mbit/s, a high-bandwidth channel for back-plane applications at 1.25 Gbit/s may be provided. For a high-bandwidth channel at 1.25 Gbit/s, the system of FIG. 1 may include a synchronization (sync) FIFO 120 between the transmit and receive sections. The sync FIFO allows each data of each single-channel link to be written into the sync FIFO using the clock recovered from each link (i.e., non-data aligned at the packet data level), and then aligning the data timing through the process of reading data from the sync FIFO (i.e., to align data at the packet data level). When four single-channel links are available, each operating at 622 Mbit/s, a high-bandwidth channel for back-plane applications at 2.5 Gbit/sec may be provided. A sync FIFO may be used for the high-bandwidth link operating at 2.5 Gbit/s in a manner similar to that described for the 1.25 Gbit/s high-bandwidth link.

As would be apparent to one skilled in the art, the present invention may employ single-channel links that operate at different data rates. When such single-channel links are employed, the calculation of inter-packet fill, FIFO buffering, and/or clock synchronization are modified in a straightforward manner with techniques well-known in the art of digital data transmission.

As would be apparent to one skilled in the art, several factors may affect the choice of coding used for error detection and error detection/correction. Timing and clock synchronization to the received signal of the high-bandwidth channel is one factor. For example, a 1.25 Gbit/s link with N=2 may implement a synchronization FIFO buffer, while a single-channel link operating at 622 Mbit/s link (i.e., N is one) is a standalone link that the receive side synchronizes to (recovers its clock from) the received signal directly.

While the exemplary embodiments of the present invention have been described with respect to systems, as would be apparent to one skilled in the art, various functions may be implemented in the digital domain as processing steps in a software program, by digital logic, or in combination of both software and hardware. Such software may be employed in, for example, a digital signal processor, microcontroller or general-purpose computer. Such hardware and software may be embodied within circuits implemented in an integrated circuit.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A transmitter coupled to at least two single-channel links of a high-bandwidth link, the transmitter comprising:
    at least two registers, each associated with a different single-channel link and each receiving a different portion of user data provided to the transmitter from a module; and
    a framer adapted to i) provide the user data from the module as a plurality of packets, each having a packet delineator and based on a packet format, and ii) ensure that the packet delineators of all of the packets are provided on a common single-channel link; and
    wherein a common register provides a portion of each packet with the packet delineator to the common single-channel link, and each register provides a corresponding portion of each packet to an associated single-channel link.

2. The invention as recited in claim 1, wherein, for a sequence of packets, the transmitter inserts inter-packet fill to provide the packet delineator of each packet on the common single-channel link.

3. The invention as recited in claim 1, wherein at least one single-channel link is a serial link.

4. The invention as recited in claim 3, wherein the serial link is an 8B/10B encoded link operating in accordance with either a Ethernet standard, a Fibre-channel standard, or a Infiniband standard.

5. The invention as recited in claim 3, wherein the serial link applies scrambling to each packet including the user data.

6. The invention as recited in claim 3, wherein the serial link operates in accordance with a SONET standard.

7. The invention as recited in claim 1, wherein the at least two single-channel links are parallel links.

8. The invention as recited in claim 7, wherein the parallel links operate in accordance with either a PCI bus standard or a RapidIO standard.

9. The invention as recited in claim 1, wherein the transmitter operates in a node in accordance with an asynchronous transfer mode standard or a synchronous optical network standard.

10. The invention as recited in claim 1, wherein the transmitter is embodied in an integrated circuit.

11. A receiver generating user data for a module from a plurality of packets received from at least two single-channel links forming a high-bandwidth link, the receiver comprising:
    at least two registers, each receiving a different portion of each packet, wherein
        a common register provides a portion of each packet with a packet delineator from a common single-channel link, and each register provides a corresponding portion of each packet from an associated single-channel link; and
    a framer that 1) forms each packet from a corresponding packet delineator and 2) extracts the user data based on a packet format.

12. The invention as recited in claim 11, wherein the packet format includes information in at least one message channel other than the user data.

13. The invention as recited in claim 11, wherein the packet format includes error detection or error detection/correction information.

14. The invention as recited in claim 13, wherein the error detection or error detection/correction information is cyclic redundancy check information.

15. The invention as recited in claim 11, wherein the packet format allows for discarding of inter-packet fill.

16. The invention as recited in claim 11, wherein the apparatus operates in a node in accordance with an asynchronous transfer mode standard or a synchronous optical network standard.

17. The invention as recited in claim 11, wherein the circuit is embodied in an integrated circuit.

18. A method of transmitting user data from a module over at least two single-channel links of a high-bandwidth link, the method comprising the steps of:
    (a) receiving, in each of at least two registers, each having a corresponding single-channel link, a different portion of user data from the module;
    (b) providing the user data as a plurality of packets, each having a packet delineator and based on a packet format; and
    (c) ensuring that the packet delineators of all of the packets are provided on a common single-channel link; and
    wherein a common register provides a portion of each packet with the packet delineator to the common single-channel link, and each register provides a corresponding portion of each packet to an associated single-channel link.

19. The invention as recited in claim 18, wherein step (b) further includes the step of inserting inter-packet fill such that the packet delineator occurs on the common single-channel link for each packet in a sequence of packets.

20. The invention as recited in claim 18, wherein, for step (b) at least one single-channel link is a serial link.

21. The invention as recited in claim 20, wherein, for step (b) the serial link is an 8B/10B encoded link operating in accordance with either a Ethernet standard, a Fibre-channel standard, or a Infiniband standard.

22. The invention as recited in claim 20, further including the step of scrambling at least one portion of each packet including the user data.

23. The invention as recited in claim 20, wherein, for step (b), the serial link operates in accordance with a SONET standard.

24. The invention as recited in claim 18, wherein, for step (b) the at least two single-channel links are parallel links.

25. The invention as recited in claim 18, wherein, for step (b) the parallel links operate in accordance with either a PCI bus standard or a RapidIO standard.

26. The invention as recited in claim 18, wherein the method is implemented within a node in accordance with an asynchronous transfer mode standard or a synchronous optical network standard.

27. The invention as recited in claim 18, wherein the method is implemented within a processor of an integrated circuit.

28. A method of generating user data for a module from a plurality of packets received from at least two single-channel links forming a high-bandwidth link, the method comprising the steps of:
    (a) receiving, in each of at least two registers, a corresponding portion of each packet;
    (b) providing a different portion of each packet with a packet delineator from a common single-channel link, and 2) a corresponding portion of each packet from an associated single-channel link;
    (c) forming each packet from a corresponding packet delineator; and
    (d) extracting the user data based on a packet format.

29. The invention as recited in claim 28, wherein step (d) extracts information in at least one message channel other than the user data.

30. The invention as recited in claim 28, wherein step (c) forms each packet based on error detection or error detection/correction information included with the packet in accordance with the packet format.

31. The invention as recited in claim 30, wherein the error detection or error detection/correction information is cyclic redundancy check information.

32. The invention as recited in claim 28, wherein step (c) discards inter-packet fill.

33. The invention as recited in claim 28, wherein the method is implemented within a node in accordance with an asynchronous transfer mode standard or a synchronous optical network standard.

34. The invention as recited in claim 28, wherein the method is implemented within a processor of an integrated circuit.

35. The invention as recited in claim 1, wherein the transmitter is adapted to provide the packet delineator of each packet to the common single-channel link independent of the sizes of the packets.

36. The invention as recited in claim 11, wherein the receiver is adapted to provide the packet delineator of each packet from the common single-channel link independent of the sizes of the packets.

37. The invention as recited in claim 18, wherein the provision of the portion of each packet with the packet delineator to the common single-channel link occurs independently of the sizes of the packets.

38. The invention as recited in claim 28, wherein the receipt of the portion of each packet with the packet delineator from the common single-channel link occurs independently of the sizes of the packets.

* * * * *